United States Patent Office 2,771,457
Patented Nov. 20, 1956

2,771,457

PRODUCTION OF VINYL CHLORIDE POLYMERS

Arthur William Barnes, Tewin, Bernard Stephen Dyer, Tewin Wood, Welwyn, and Austin Atkinson Gibson, Cleveleys, England, assignors to Imperial Chemical Industries Limited, a corporation of Great Britain No Drawing. Application May 14, 1951,
Serial No. 226,298

Claims priority, application Great Britain June 15, 1950

7 Claims. (Cl. 260—29.6)

This invention relates to improvements in the production of vinyl chloride polymers, including copolymers prepared from mixtures of copolymerisable compounds containing at least 50% by weight of vinyl chloride.

Polymers and copolymers of vinyl chloride are frequently made by the emulsion polymerisation technique in which the monomer or monomer mixture is dispersed in water containing an emulsifying agent and polymerised under the influence of a water-soluble catalyst and heat. The product is a dispersion of polymer often referred to as a polymer latex on account of its similarity in appearance to rubber latex. The polymer particles contained in the latex usually have diameters lying between about .01 $\mu$ or less and .2 $\mu$. The large majority of the particles in any given latex normally have diameters towards the lower end of the size range, however, with the result that the numerical average of the particle diameters usually lies between .01 $\mu$ and about .05 $\mu$.

The mechanical stability of the polymer latex obtained, i. e. its capacity to remain essentially unchanged in physical form when subjected, for example, to mechanical shocks or to the action of electrolytes, depends partly upon the concentration of emulsifying agent present. In the past it has been customary to add relatively large amounts of emulsifying agent to the latex in order to increase its stability and to make it capable of withstanding mechanical shocks, transport and storage before use without any undue coagulation occurring. It is also necessary for the latex to have a certain minimum stability if the polymer particles are to be separated from the latex by spray-drying.

There is a limit, however, to the stability which can be imparted to a latex by the addition of emusifying agents. In any case, the use of excessively large amounts of emulsifying agents is undersirable as emulsifying agents are frequently relatively expensive materials and also tend to impair the properties of the polymer contained in the latex. The presence of emulsifying agent increases the water absorption and power factor of the polymer, for example, and also reduces its electrical resistivity. Any process whereby polymer latices of high stability may be prepared without the use of large amounts of emulsifying agent is therefore of commercial and technical importance.

Polymer separated from the latex, e. g. by coagulation or by spray-drying, is, as is known, suitable for use in a large number of applications. It is often used in the form of a dispersion in plasticiser, known as a paste. These pastes are characterised by the fact that under the influence of heat they change from a fluid to an elastic solid by the process known as gelation. In order to obtain pastes which are of low viscosity and therefore easily processed, e. g. by dipping and spreading, and yet contain a sufficiently high concentration of polymer to give, on gelation, solids having the required degree of resilience, toughness, elasticity and the like, it has been found desirable to use polymer particles which are spherical in shape, such as may be obtained by emulsion polymerisation, but which are rather larger in size than those obtained by conventional emulsion polymerisation processes.

According to the present invention we provide a process for the production of aqueous dispersions of polymers and copolymers of vinyl chloride by polymerising vinyl chloride, if desired with up to its own weight of copolymerisable material, in the presence of water containing a dissolved polymerisation catalyst, the process being characterised in that emulsifying agent is introduced into the polymerisation system only after the polymerisation has commenced but before the polymer dispersion formed begins to coagulate.

We find that by this process polymer latices having improved mechanical stabilities are obtained by the use of no more or even considerably less than the amounts of emulsifying agent normally employed. It is also possible to prepare by this process latices containing polymer particles which are large in size, having diameters with a numerical average, for example, of between 0.1 and 0.5 $\mu$ or higher. These particles may be isolated and used to prepare polymer/plasticiser pastes which contain a high concentration of polymer and yet are of low viscosity.

A further characteristic of the latices produced by the process of the present invention is that they usually contain polymer particles of remarkably uniform size. Under certain circumstances this also may be an advantage, e. g. in applications of the polymer in which accurate control of particle size is important.

In order to obtain latices exhibiting the above-mentioned features in a high degree, it is desirable to allow the polymer content of the polymerisation system to reach 0.5% by weight, preferably 1% by weight, before emulsifying agent is introduced.

The stage of the polymerisation, i. e. the polymer content of the system, at which coagulation commences depends upon a number of factors, including the rate at which the system is stirred. Under conditions such as are commonly employed in emulsion polymerisation processes, there is a danger of coagulation commencing if the polymer content is allowed to exceed about 8% by weight before emulsifying agent is introduced. The polymer content of the system may be determined by withdrawing a sample of the dispersion, allowing the unconverted monomer to evaporate and carrying out specific gravity or turbidity measurements. Thus, the phrase "polymer content of the polymerization system" refers to the weight percent of polymer based on the weight of the polymerization system exclusive of unconverted monomer.

The addition of emulsifying agent to the system may be effected in one step, in a number of steps or continuously during the course of at least a part of the remainder of the polymerisation after the initial introduction. If the amount of emulsifying agent present during the polymerisation is allowed greatly to exceed that required to provide the dispersion with the required mechanical stability there is a tendency for new centres of polymerisation to be formed. This results in the final latex containing a proportion of polymer particles of varying sizes smaller than the remainder which are uniform in size. It is also found to result in a latex of somewhat reduced stability. It is preferred, therefore, to keep the concentration of emulsifying agent at all stages of the polymerisation as low as is possible without coagulation occurring. This may best be achieved by adding the emulsifying agent to the system continuously or, failing that, in a stepwise manner. If the final latex prepared in this way does not have the desired stability, this may be remedied by adding further emulsifying agent at the end of the polymerisation. This may be necessary, for example, when it is desired to separate the polymer from the latex by spray-drying, in order to prevent premature separation of the polymer. The emulsifying agent added after the end of the polymerisation process may be the same as that used during the polymerisation or different, as desired. A greater stabilising effect may sometimes be obtained by using a different emulsifying agent.

Any of the usual emulsifying agents may be used in the process of the present invention. These include alkali metal and ammonium salts of sulphonated or sulphated long-chain hydrocarbons and animal and vegetable fats and oils, water-soluble salts of sulphuric acid esters of fatty alcohols, i. e. alcohols corresponding to fatty acids of animal and vegetable fats and oils, and soaps. Examples of specific suitable emulsifying agents include sodium lauryl sulphate, sodium oleyl sulphate, sodium cetyl sulphate, the sodium salt of sulphonated castor oil, the sodium and ammonium salts of sulphonated or sulphated methyl oleate, sodium oleate, sodium palmitate, sodium stearate, ammonium palmitate, ammonium stearate and ammonium oleate. Some of these emulsifying agents, e. g. sodium stearate, are particularly valuable because they are also heat stabilisers for vinyl chloride polymers, and may therefore, from this point of view, be retained in the polymers after polymerisation with advantage.

Additional quantities of monomeric material may be introduced into the polymerisation system as the polymerisation proceeds if desired, the size of the polymer particles in the final latex depending on the total quantity of monomeric material polymerised. There is a limit to the particle size which can be achieved in any given polymerisation system, however, since the solids content of the polymer latex produced cannot be increased beyond a certain maximum value without coagulation occurring. If water is added to the polymerisation system as well as fresh monomeric material, however, particles of exceptionally large size may be obtained. The fresh monomeric material may be added in the form either of liquid or vapour.

If owing to the use of restricted amounts of emulsifying agent, slow rates of stirring are adopted in order to prevent coagulation of the dispersion, there may be a tendency for liquid monomeric material to separate out from the dispersion. This may be prevented by adding monomeric material during the polymerisation at a rate such that at any time the amount of monomeric material in the system is not greater than that just sufficient to provide a partial pressure of vapour of monomeric material equal to its saturation value at the temperature of the polymerisation, i. e. by adding monomeric material at such a rate that substantially no undissolved liquid monomeric material is allowed to collect in the system.

If it is desired to produce very large polymer particles of uniform size, polymer particles produced by the process of the present invention may be used as "seed" in a further emulsion polymerisation process; e. g. a portion of polymer latex produced by the process of the present invention may be introduced into a second polymerisation mixture before polymerisation of the latter is initiated. On initiating the polymerisation, the new polymer which is formed builds up almost entirely on the already existing polymer particles provided that excessive amounts of emulsifying agent are not present, with the result that very large particles can be obtained. These may, if desired, be used as seed in yet another polymerisation, i. e. the seeding technique may be repeated if desired. As polymer particles which are already large in size may be obtained by the process of the present invention, however, for most purposes it is unnecessary to resort to the seeding technique in order to obtain particles of any desired size and even more rarely necessary to employ successive seedings.

Examples of compounds which may be copolymerised with vinyl chloride by the process of this invention include vinyl acetate, vinyl propionate, vinyl butyrate, vinylidene chloride, acrylonitrile, ethyl acrylate, methyl methacrylate, methyl alpha-chloroacrylate, maleic acid, fumaric acid, diethyl maleate and diethyl fumarate. If fresh monomeric material is added to the polymerisation system during a copolymerisation process it is preferable, in order to obtain a homogeneous copolymer, to add the individual monomers at rates such that their relative proportions remain approximately constant throughout the polymerisation.

Examples of catalysts which may be used to activate the polymerisation include peroxy compounds such as hydrogen peroxide, and water-soluble persulphates such as alkali metal and ammonium persulphates. The polymerisation catalyst may, if desired, be used in conjunction with activating materials as described in the prior art, for example, persulphates may be activated by soluble copper salts and used in the presence of a small partial pressure of oxygen as described in British specifications Nos. 589,264 and 598,777.

When carrying out the process of the present invention there is, if special precautions are not taken, a certain danger of the polymer dispersion beginning to coagulate before the emulsifying agent is introduced, with consequent waste of material. The danger of inadvertently exceeding the limit to which the polymerisation may safely be allowed to proceed before the emulsifying agent is introduced arises largely from the lack of a rapid, accurate and convenient method of determining the polymer content of the system whilst the polymerisation is proceeding, it not being possible to interrupt the polymerisation whilst the determination is being made. A preferred method of polymerising vinyl chloride by the process of the present invention makes it possible to know when the polymer content of the system reaches the value at which it is desired to introduce the emulsifying agent. This method takes advantage of the following facts relating to the emulsion polymerisation of vinyl chloride.

When vinyl chloride is polymerised in emulsion, the partial pressure exerted in the system by the monomer during the polymerisation is equal to its saturation pressure at the temperature of the polymerisation so long as emulsified droplets of liquid monomer remain in the system. The polymer particles which are formed as the polymerisation proceeds are capable, however, of absorbing a certain amount of the monomer. As a result, when a certain proportion of the monomer has been polymerised the polymer particles are able to absorb the remainder of the monomer. When this occurs there is a marked decrease in the vapour pressure of the system. The proportion of monomer which has been converted to polymer when the vapour pressure decreases in a batch process depends on the volume of the gas space above the emulsion in the polymerisation vessel but under the conditions normally employed in the emulsion polymerisation of vinyl chloride the decrease in vapour pressure occurs at a conversion of about 55 percent by weight. If the gas space has a volume greatly in excess of that of the emulsion the percentage conversion at the decrease in vapour pressure will be rather less than 55 percent because there will be a correspondingly larger proportion of monomeric vapour in the gas space. The percentage conversion at which the decrease in vapour pressure occurs under these conditions using any given monomer charge may be determined, if necessary, however, by a polymerisation in which the unpolymerised monomer is released from the polymerisation vessel when the vapour pressure decreases and the solids content of the system then determined. It is possible, therefore, either to calculate or to determine practically the initial monomer charge which is required for the vapour pressure during the polymerisation to decrease at the time when the polymer content reaches any desired value which is capable of being attained in practice.

In the preferred method of carrying out the process of the present invention there is introduced into the polymerisation system initially an amount of vinyl chloride such that the decrease in vapour pressure observed as the polymerisation proceeds will give an indication of the time when the polymer content of the system reaches the value at which emulsifying agent is to be introduced, further vinyl chloride being introduced after, but only after, the decrease in vapour pressure is observed.

The amount of vinyl chloride introduced into the system may, if desired, be such that the decrease in vapour pressure occurs at a polymer content which is less than that at which it is decided to introduce the emulsifying agent and the introduction of emulsifying agent delayed either by what is estimated to be the necessary period after the decrease in vapour pressure is observed or until the pressure drops to a value decided upon in advance. This method of working has little to recommend it, however, and owing to the fact that polymerisation processes are not, in general, accurately reproducible, to delay the introduction of emulsifying agent for an undue period of time after the decrease in vapour pressure occurs is to run the risk of the polymer dispersion beginning to coagulate and thus to forfeit the main advantage offered by this preferred method of carrying out the invention.

When operating by the preferred method, the balance of the monomeric material to be polymerised may be added together with the emulsifying agent or subsequently and may be added in one portion or in a number of portions or continuously as desired.

Polymer latices obtained by the process of the present invention may be employed as such, for example, in the production of films and coatings. Examples of specific applications for which they are valuable include textile proofing, paper coating, felt impregnation, fabric bonding and yarn coating. The latices may be applied by such methods as spreading, impregnation, spraying, dipping and electro-deposition and may be plasticised before use, if desired, either by adding an emulsion of plasticiser in water to the latex or by emulsifying the plasticiser in the water of the latex. Other adjuvants such as pigments, fillers and heat-stabilisers may also be incorporated.

Alternatively, the polymer latices may be treated in order to isolate the solid polymer, e. g. by spray-drying. Spray-drying sometimes causes partial aggregation of the spherical polymer particles which is a disadvantage if the polymer is to be used for the production of polymer/plasticiser pastes since in order to obtain polymer particles of the size desired for this application it is necessary to subject the spray-dried product to a disintegration process. This results in the formation of particles of irregular shape as opposed to spherical particles which are preferred for the production of pastes. It is preferred, therefore, when the polymer is to be used in the production of pastes, or in any other application where spherical particles are preferred, to coagulate the latex, e. g. by addition of an electrolyte, and then after washing to dry the resulting slurry either by evaporation in layers or by spray-drying. By this method a product is obtained in which the polymer particles are only loosely aggregated and may easily be separated as spherical particles by a mild disintegration process.

The polymer may be modified by the addition of pigments plasticisers, fillers and heat and light stabilisers as desired and may be used in the production of coatings, films and other shaped articles by moulding, extrusion, calendering and other processes of treatment and fabrication commonly applied to vinyl chloride polymers. As indicated hereinbefore it may also be used for the production of pastes by mixing with plasticisers such as, for example, tricresyl phosphate, dibutyl sebacate, dibutyl phthalate, branched chain octyl and nonyl phthalates and linear polyesters such as those described in British specification No. 624,393. Pastes thus obtained are very suitable for the production of shaped articles or for use in coating applications. These pastes may be produced, if desired, by the process described in British specification No. 589,715. In this process the polymer is subjected to a heat treatment before it is mixed with the plasticiser in order to obtain a paste having a long storage life.

Our invention is illustrated, but not limited, by the following examples in which all parts are by weight.

*Example I*

65,000 parts of water, 38,500 parts of vinyl chloride and 12 parts of ammonium persulphate were introduced into an evacuated autoclave fitted with a stirrer. The mixture was stirred and its temperature raised to 50° C. in order to effect polymerisation. After 2 hours, by which time the polymer content of the system had reached approximately 1% by weight, 72.5 parts of the sodium salt of a highly sulphonated methyl oleate were introduced. Polymerisation was allowed to continue until a latex containing 31% by weight of polymer was obtained.

Examination of the polymer particles contained in the latex by means of an electron microscope showed them to be uniform spheres, 0.4 $\mu$ in diameter.

The mechanical stability of the latex was much greater than that of one prepared by a similar process employing the same quantity of emulsifying agent but in which the emulsifying agent was introduced before the polymerisation commenced. The final stability on adding a further equal quantity of emulsifying agent to each latex was also much greater in the case of the latex prepared according to the present invention.

*Example II*

In this example it had been decided to introduce the emulsifying agent when the polymer content of the system reached 5% by weight and for that reason an autoclave fitted with a stirrer and a pressure gauge was charged with 65,000 parts of water, 6,500 parts of vinyl chloride and 12 parts of ammonium persulphate. The mixture was stirred and heated to 50° C. to effect polymerisation. It was known that under these conditions the decrease in vapour pressure observed as the polymerisation proceeded would occur when approximately 55% by weight of the vinyl chloride had been converted to polymer, i. e. when the polymer content of the system reached approximately 5% by weight. The pressure indicated initially by the gauge was 100 lb./sq. inch. After about 10 hours the pressure began to fall. When it reached 95 lb./sq. inch, 72.5 parts of the sodium salt of a highly sulphonated methyl oleate were added, followed by 32,500 parts of vinyl chloride. The polymerisation was continued for a further period of about 12 hours to yield a latex containing 28% of polymer.

Electron microscope examination of the polymer particles contained in the latex showed them to be uniform spheres, 0.3 $\mu$ in diameter.

As in Example I the latex was found to be much more stable than one prepared by a similar process in which the emulsifying agent was introduced before the start of the polymerisation and a much greater final stability in the case of the latex prepared according to the present invention was again observed on adding further equal portions of emulsifying agent to the latices.

*Example III*

This example describes a variation of Example II which illustrates the possibility of adding the vinyl chloride remaining after the initial introduction in more than one portion.

65,000 parts of water, 6,500 parts of vinyl chloride and 12 parts of ammonium persulphate were introduced into an evacuated autoclave fitted with a stirrer and a pressure gauge. The mixture was stirred and the temperature raised to 50° C. in order to effect polymerisation. The pressure initially indicated by the gauge was 100 lb./sq. inch. After some hours the pressure fell to 95 lb./sq. inch, whereupon 72.5 parts of the sodium salt of a highly sulphonated methyl oleate followed by a further 6,500 parts of vinyl chloride were added. The pressure thereupon rose to 100 lb./sq. inch. After a further period the pressure fell again to 95 lb./sq. inch, and was again restored by the addition of a further 6,500 parts of vinyl chloride. This process was repeated until, in all, 39,000 parts of vinyl chloride had been added. Including the first, there were therefore six separate additions of vinyl chloride. These extended over a period of 21 hours.

A latex containing 36% by weight of polymer was finally obtained. This was found by examination with an electron microscope, to contain polymer particles which were uniform spheres, 0.46 μ in diameter.

The latex was again much more stable than one prepared by a similar process but in which the emulsifying agent was introduced before the polymerisation began and once more a much greater final stability on adding further emulsifying agent was observed.

*Example IV*

This example illustrates the production of a copolymer of vinyl chloride and vinyl acetate.

1870 parts of water containing 10 parts of sodium acetate and 3 parts of glacial acetic acid, 216 parts of vinyl chloride, 34 parts of vinyl acetate and 1.5 parts of ammonium persulphate were introduced into an autoclave which was fitted with a stirrer and pressure gauge and which had been purged with nitrogen. The function of the sodium acetate and acetic acid was to maintain a pH value of about 4.8 and thus prevent undesirable hydrolysis of the vinyl acetate during the polymerisation.

The mixture was stirred and polymerisation commenced at 50° C. The pressure recorded initially by the gauge was 109 lb./sq. inch. After about 2½ hours the pressure had fallen to 90 lb./sq. inch, whereupon 20 parts of the sodium salt of a highly sulphonated methyl oleate followed by a mixture of 736 parts of vinyl chloride and 114 parts of vinyl acetate were added. Polymerisation was then continued until a latex containing 34% of the interpolymer was obtained. This latex was much more stable than one prepared by a similar process but in which the emulsifying agent was introduced before the commencement of the polymerisation.

*Example V*

The latex obtained by Example I was coagulated by the addition of sodium chloride solution and the resulting slurry dried. On milling the product, a fine free-flowing powder was obtained. By mixing this with an equal weight of plasticiser (tricresyl phosphate) a smooth fluid paste was produced having a viscosity at 25° C. of 80 poises.

We claim:

1. In a process for the production of aqueous dispersions of polymers and copolymers of vinyl chloride by polymerizing vinyl chloride with up to its own weight of ethylenically unsaturated copolymerizable material in the presence of water containing a dissolved peroxy polymerization catalyst, the improvement which comprises obtaining polymer particles of large uniform size by initiating the polymerization in the absence of an emulsifying agent and introducing an emulsifying agent after the polymer content of the system has reached approximately 0.5% by weight of the polymerization system but before the polymer dispersion begins to coagulate, said emulsifying agent being introduced in an amount sufficient to provide mechanical stability but insufficient to impair the properties of the polymer contained in the dispersion produced.

2. A process as recited in claim 1 in which said dissolved peroxy polymerization catalyst is a persulphate.

3. A process as recited in claim 1 in which the emulsifying agent is employed in less than the usual amount.

4. A process as recited in claim 1 in which the emulsifying agent is employed in an amount less than 1.82% based on the total weight of monomeric material.

5. A process as recited in claim 1 in which further monomeric material is introduced into the polymerization system after the commencement of the polymerization.

6. A process as recited in claim 1 in which the emulsifying agent is introduced into the polymerization system in more than a single charge.

7. In a process for the production of aqueous dispersions of polymers and copolymers of vinyl chloride by polymerizing vinyl chloride with up to its own weight of ethylenically unsaturated copolymerizable material in the presence of water containing a dissolved persulphate polymerization catalyst, the improvement which comprises obtaining polymer particles of large uniform size by initiating the polymerization in the absence of emulsifying agent until a decrease in the vapor pressure of the monomeric material is observed, introducing an emulsifying agent and additional monomeric material into said polymerization system after said vapor pressure drop has been observed but before the polymer dispersion begins to coagulate, said emulsifying agent being a usual emulsifying agent in vinyl chloride polymerizations and being introduced in an amount sufficient to provide mechanical stability but insufficient to impair the properties of the polymer contained in the dispersion produced.

References Cited in the file of this patent

UNITED STATES PATENTS

| | | |
|---|---|---|
| 2,296,403 | Renfrew | Sept. 22, 1942 |
| 2,520,959 | Powers | Sept. 5, 1950 |
| 2,579,908 | Davison | Dec. 25, 1951 |

OTHER REFERENCES

Borders: Ind. Eng. Chem.; 40, 1473–1477 (Aug. 1948).